Sept. 13, 1955  Y. A. GODON  2,717,467
COMBINED FISHHOOK AND GAFF
Filed July 16, 1954
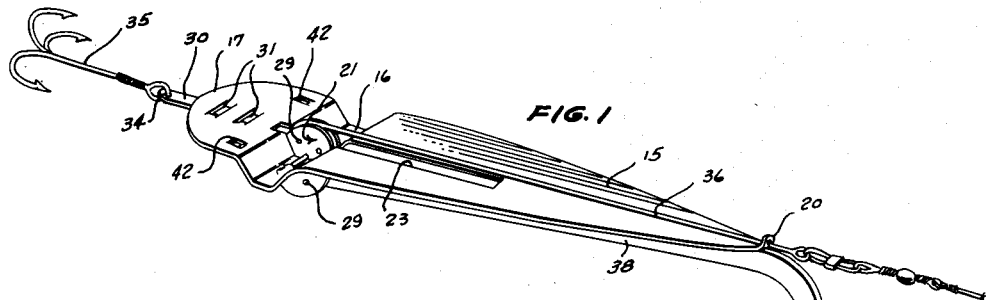
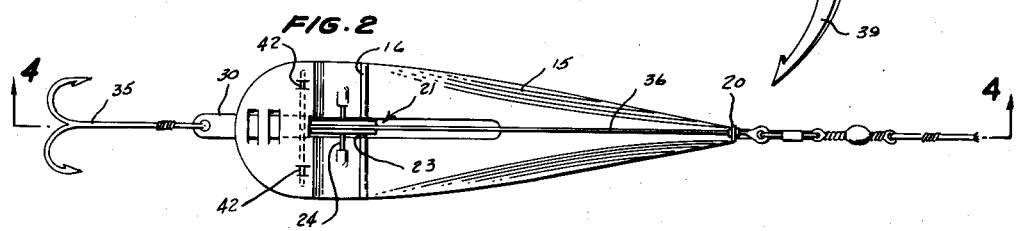
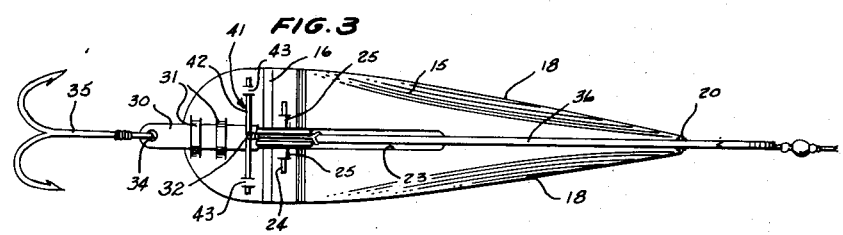
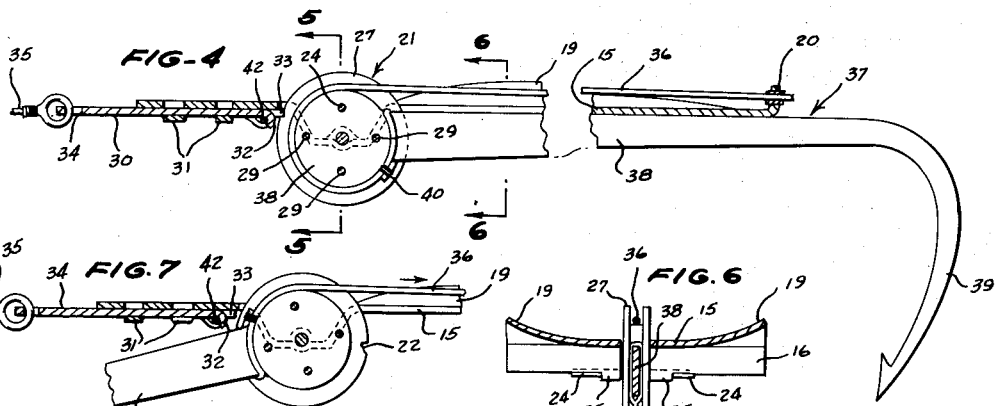
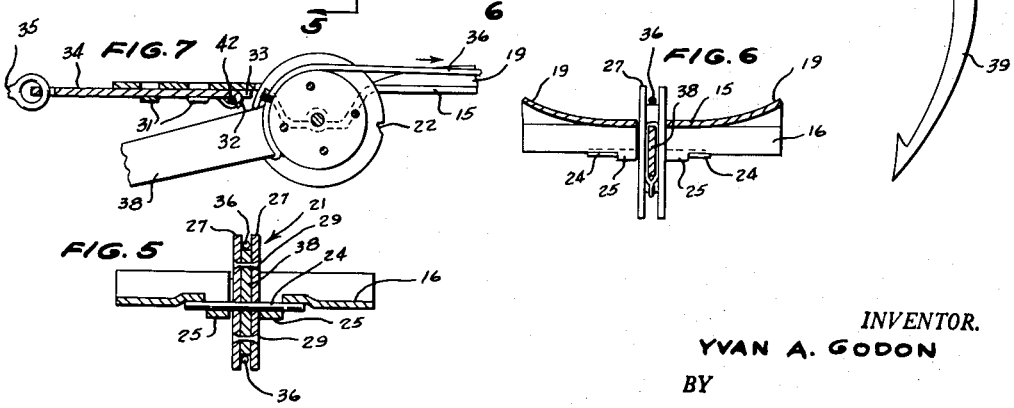
INVENTOR.
YVAN A. GODON
BY
McMorrow, Berman & Davidson
ATTORNEYS United States Patent Office 2,717,467
Patented Sept. 13, 1955

2,717,467

COMBINED FISHHOOK AND GAFF

Yvan A. Godon, Montreal, Quebec, Canada

Application July 16, 1954, Serial No. 443,934

2 Claims. (Cl. 43—35)

This invention relates to a combined fishhook and gaff.

An object of the invention is to provide a combined fishhook and gaff of the type in which the gaff swings forward, when a fish is engaged on the hook, to gaff the fish, the body and gaff elements being of exceptionally simple and durable construction and being so formed and arranged and so connected as to be particularly suited to the performance of their functions within the water.

Other objects and advantages will appear from the following description considered in conjunction with the attached drawings, in which:

Figure 1 is a perspective view of the combined fishhook and gaff of the present invention with the gaff in the normal position;

Figure 2 is a top plan view of the assembly of Figure 1;

Figure 3 is a bottom plan view of the assembly of Figure 1;

Figure 4 is a view taken along line 4—4 of Figure 2;

Figure 5 is a view taken along line 5—5 of Figure 4;

Figure 6 is a view taken along line 6—6 of Figure 4; and

Figure 7 is a view of the assembly of Figure 4 with portions broken away and showing the shank end of the gaff in the gaffing position.

Referring to the drawings in more detail, the reference numeral 15 designates a flat body having a transversely extending trough 16 formed therein adjacent one end thereof. The portion of the body 15 on the side of the trough 16 adjacent one end of the body 15 is rounded, as shown at 17, while the portion of the body on the other side of the trough 16 tapers from the trough to the other end of the body 15, as shown at 18. The side edges of the tapered portion of the body 15 are curved outwardly in the direction of the open face of the trough 16, as shown at 19.

An eye 20 is formed in the other end of the body 15, the eye 20 being formed by the turning outwardly in the direction of the open face of the trough 16 of the tip of the tapered portion of the body 15 and perforating the turned tip.

Extending transversely through the trough 16, intermediate its ends, is a pulley, generally designated 21, connected to the body 15 for rotation about an axis parallel to the trough 16, the pulley 21 having a notch 22 in its rim. The pulley 21 extends through the trough 16 in a slot 23 formed in the mid-portion of the body 15 and extending transversely of the trough 16. The pulley 21 is pivoted in the bottom of the trough 16 upon a pin 24 which extends longitudinally of the bottom of the trough 16 and has its ends extending through strips 25 bowed upwardly from the bottom of the trough 16. The pin 24 is thus held substantially in the plane of the bottom of the trough 16.

The pulley itself consists of a pair of spaced parallel discs 27 disposed on opposite sides of the long leg 38 of an L-shaped gaff 37, the discs and long leg being secured rigidly together by a plurality of rivets 29. The notch 22 in the pulley 21 consists of notches arranged at corresponding positions in the peripheries of both discs 27.

Slidably supported in the rounded end portion of the body 15, is a bar 30 having one end normally engaged in the notch 22, the other end of the bar 30 being exteriorly of the rounded end portion of the body 15. The bar 30 is inserted between a pair of strips 31 of the rounded end portion of the body 15, cut free along their sides and bowed outwardly, and the adjacent part of the rounded end portion of the body 15 so that the bar 30 is slidable longitudinally of the body 15. The mid-portion of the inner end of the bar 30 is turned outwardly, as shown at 32, leaving the side portions 33 of the inner end of the bar 30 projecting as detents to be engaged in the notches in the discs 27, constituting the notch 22 of the pulley 21, when the bar 30 is moved inwardly of the body 15. The outer end of the bar 30 is provided with an eye 34 in which the shank end of a fishhook 35 is pivotally secured.

A resilient catch 41 is positioned upon the rounded portion of the body 15 and releasably holds the bar 30 in engagement with the notch 22. The catch 41 consists of a length of spring wire 42 extending across the bar 30, adjacent the pulley 21, and secured adjacent each end to the body 15 by being passed between a strip of the body 15, cut free along its sides and bowed outwardly, and the adjacent portion of the body 15. The mid-portion of the wire 42 engages the bent mid-portion 32 of the inner end of the bar 30, when the bar is in engagement in the notch 22, to hold the bar 30 releasably in that position.

Extending through the eye 20, is a fishing line 36, having one end portion partially encircling the pulley 21 with the adjacent end of the line 36 secured to the pulley 21. The line 36 extends slidably through the eye 20 and about the portion of the pulley 21 remote from the eye 20.

The L-shaped gaff 37 is arranged with its long leg 38 extending along the tapered end portion of the body 15 and has its free end connected to the pulley 21 for movement therewith, as above described, the short leg 39 of the gaff 37 extending away from the body 15. The end of the fishing line 36 is secured to the pulley 21 by being looped about the free end of the long leg 38 at the point at which the leg joins the discs 27 of the pulley 21, and is tied upon itself, as shown at 40.

As will be apparent from the foregoing description, the combined fishhook and gaff of the present invention is secured upon the free end of a fishing line, the line extending through the eye 20 and being secured about the pulley 21 as above described. The device is then cast into the water in the usual manner. When a fish takes the hook 35 and becomes engaged thereon, the operation of the gaff element of the device of the present invention comes into play. The pull of the fish upon the hook 35 is effective to draw the bar 30 outwardly of the body 15, against the urging of the resilient catch 41, drawing the detent ends 33 of the bar 30 from the notch 22 and freeing the pulley 21 for rotation about its axis 24. The continued pull of the fish upon the hook 35 while the unattached end of the fishing line 36 is held securely in the hand of the fisherman, causes the unreeling of the line 36 from the pulley 21 and the consequent turning of the pulley 21 in the direction toward the eye 20. This movement of the pulley 21 causes the swinging movement of the gaff 37, connected integrally thereto, from its position along the tapered portion of the body 15 with the pointed support arm of the gaff directed oppositely to the open face of the trough 16, as shown in Figure 4, to a position in which the long arm 38 of the gaff 37 is adjacent and projects exteriorly of the rounded portion of the body 15, as shown in Figure 7, in which position the pointed short arm 39 of the gaff 37 extends in the direction in which the trough 16 opens and pierces the fish engaged on the hook 35. By virtue of the structure and arrangement of parts, the device of the present invention is particularly adapted to perform its functions when immersed in the water. The body 15, consisting of a single sheet of material does not include parts to become detached or housings or enclosures to lose their watertight integrity. Moreover, the arrangement and mode of connection of the pulley 21 and gaff 37 to the body 15 is extremely simple and independent of any auxiliary parts, while at the same time it affords positive and effective action upon the part of the gaff 37 at the appropriate time.

What is claimed is:

1. A combination fishhook and gaff comprising a flat body having a transversely extending trough formed therein adjacent one end thereof, the portion of said body on the side of said trough adjacent said one end thereof being rounded with the portion of said body on the other side of said trough tapering from said trough to the other end of said body, an eye upon said other end of said body, a pulley extending transversely through said trough intermediate its ends and connected to said body for rotation about an axis parallel to said trough, said pulley having a notch in its rim, a bar slidably supported in the portion of said body on the side of said trough adjacent said one end of said body and having one end normally engaged in said notch, the other end of said bar being exteriorly of said last mentioned body portion, a fishhook on the other end of said bar, a fishing line extending through said eye and having one end portion partially encircling said pulley with the adjacent end of said line attached to said pulley, and an L-shaped gaff arranged with its long leg extending along the tapered portion of said body and having its free end connected to said pulley for movement therewith, the short leg of said gaff extending away from said body.

2. A combination fishhook and gaff comprising a flat body having a transversely extending trough formed therein adjacent one end thereof, the portion of said body on the side of said trough adjacent said one end thereof being rounded with the portion of said body on the other side of said trough tapering from said trough to the other end of said body, the side edges of the tapered portion of said body being curved outwardly in the direction of the open face of said trough, an eye upon said other end of said body, a pulley extending transversely through said trough intermediate its ends and connected to said body for rotation about an axis parallel to said trough, said pulley having a notch in its rim, a bar slidably supported in the portion of said body on the side of said trough adjacent said one end of said body and having one end normally engaged in said notch, the other end of said bar being exteriorly of said last mentioned body portion, a resilient catch positioned upon said last mentioned body portion and releasably holding said bar in engagement in said notch, a fishhook on the other end of said bar, a fishing line extending through said eye and having one end portion partially encircling said pulley with the adjacent end of said line attached to said pulley, and an L-shaped gaff arranged with its long leg extending along the tapered portion of said body and having its free end connected to said pulley for movement therewith, the short leg of said gaff extending away from said body.

References Cited in the file of this patent

UNITED STATES PATENTS

| 562,851 | Prosser | June 30, 1896 |
| 1,158,666 | Evans | Nov. 2, 1915 |
| 2,606,386 | Seabeck | Aug. 12, 1952 |